US00RE47748E

(19) United States
(12) Reissued Patent
Demetriou et al.

(10) Patent Number: US RE47,748 E
(45) Date of Reissued Patent: Dec. 3, 2019

(54) PRODUCTION OF AMORPHOUS METALLIC FOAM BY POWDER CONSOLIDATION

(75) Inventors: Marios Demetriou, Hollywood, CA (US); William L. Johnson, San Marino, CA (US); Christopher Thomas Veazey, Beaverton, OR (US); Jan Schroers, Guilford, CT (US)

(73) Assignee: California Institute of Technology, Pasadena, CA (US)

(21) Appl. No.: 13/267,063

(22) Filed: Oct. 6, 2011

Related U.S. Patent Documents

Reissue of:
(64) Patent No.: 7,597,840
Issued: Oct. 6, 2009
Appl. No.: 11/338,140
Filed: Jan. 23, 2006

U.S. Applications:
(60) Provisional application No. 60/645,638, filed on Jan. 21, 2005.

(51) Int. Cl.
*B22F 3/02* (2006.01)
*B22F 3/11* (2006.01)

(52) U.S. Cl.
CPC ..... *B22F 3/1125* (2013.01); *B22F 2998/10* (2013.01); *Y10T 428/12479* (2015.01)

(58) Field of Classification Search
CPC ..... B22F 3/1125; B22F 3/02; B22F 2998/10; B22F 9/002; Y10T 428/12479
USPC ..... 419/20
See application file for complete search history.

(56) References Cited

U.S. PATENT DOCUMENTS

| | | | | |
|---|---|---|---|---|
| 3,087,807 | A | 4/1963 | Allen et al. | 75/415 |
| 4,523,621 | A | 6/1985 | Ray | 164/46 |
| 4,659,546 | A | 4/1987 | Kearns | 419/2 |
| 5,151,246 | A | 9/1992 | Baumeister et al. | 419/2 |
| 5,288,344 | A | 2/1994 | Peker et al. | 148/403 |
| 5,368,659 | A | 11/1994 | Peker et al. | 148/403 |
| 5,618,359 | A | 4/1997 | Lin et al. | 148/561 |
| 5,735,975 | A | 4/1998 | Lin et al. | 148/403 |

(Continued)

FOREIGN PATENT DOCUMENTS

| | | | |
|---|---|---|---|
| JP | 63227731 | A * | 9/1988 |
| JP | 2001-303218 | | 10/2001 |

(Continued)

OTHER PUBLICATIONS

.H. Brothers, D.C. Dunand, "Amorphous metal foams," Scripta Materialia 54 (2006) 513-520.*

(Continued)

*Primary Examiner* — Elizabeth L McKane

(74) *Attorney, Agent, or Firm* — Brownstein Hyatt Farber Schreck, LLP

(57) ABSTRACT

The formation of amorphous porous bodies and in particular to a method of manufacturing such bodies from amorphous particulate materials. The method allows for the control of the volume fraction as well as the spatial and size distribution of gas-formed pores by control of the size distribution of the powder particulates. The method allows for the production of precursors of unlimited size, and because the softened state of the amorphous metals used in the method possesses visco-plastic properties, higher plastic deformations can be attained during consolidation as well as during expansion.

44 Claims, 9 Drawing Sheets

(56) References Cited

U.S. PATENT DOCUMENTS

| | | | | |
|---|---|---|---|---|
| 6,325,868 | B1 | 12/2001 | Kim et al. | 148/403 |
| 6,669,899 | B2 | 12/2003 | Bae et al. | 419/38 |
| 2004/0035502 | A1 | 2/2004 | Kang et al. | |
| 2005/0084407 | A1 * | 4/2005 | Myrick | 419/66 |

FOREIGN PATENT DOCUMENTS

| | | | | |
|---|---|---|---|---|
| JP | 2001303218 | A | * | 10/2001 |
| WO | WO2004/076099 | A2 | | 9/2004 |
| WO | WO 2004076099 | A2 | * | 9/2004 |

OTHER PUBLICATIONS

Shen et al., "Bulk Glassy Co.sub.43Fe.sub.20Ta.sub.5.5B.sub.31.5 Alloy with High Glass-Forming Ability and Good Soft Magnetic Properties", Materials Transactions, 2001, vol. 42, No. 10, pp. 2136-2139.*

C.E. Wen, Y. Yamada, K. Shimojima, Y. Chino, H. Hosokawa, and M. Mabuchi, "Novel titanium foam for bone tissue engineering" J. Mater. Res., vol. 17, No. 10, Oct. 2002, 2633-2639.*

A.H. Brothers, D.C. Dunand, "Amorphous metal foams," Scripta Materialia 54 (2006) 513-520.*

Duwez et al., "Continuous Series of Metastable Solid Solutions in Silver-Copper Alloys", J. Applied Phys., 1960, vol. 31, No. 135, pp. 1136-1137.

Turnbull, "The Subcooling of Liquid Metals", Journal of Applied Physics, Aug. 1949, vol. 20, p. 817.

Vonnegut, "Variation with Temperature of the Nucleation Rate of Supercooled Liquid Tin and Water Drops", J. Colloid Sci., 1948, vol. 3, pp. 563-569.

Kearns et al., "Manufacture of a Novel Porous Metal", The International Journal of Powder Metallurgy, 1988, vol. 24, No. 1, pp. 59-64.

Ohtera et al., "High Mechanical Strength of Aluminum-Based Crystalline Alloys Produced by Warm Consolidation of Amorphous Powder", Materials Science and Engineering, 1991, vol. A134, pp. 1212-1214.

Kunze et al., "P/M Technology for the Production of Metal Foams", Powder Metallurgy International, 1993, vol. 25, No. 4, pp. 182-185, Table of Contents page.

Schroers et al., "Synthesis Method for Amorphous Metallic Foam", Journal of Applied Physics, Dec. 15, 2004, vol. 96, No. 12, pp. 7723-7730.

Inoue et al., "Bulk Amorphous Alloys with High Mechanical Strength and Good Soft Magnetic Properties in Fe-TM-B (TM=IV-VIII Group Transition Metal) System", Appl. Phys. Lett., Jul. 28, 1997, vol. 71, No. 4, pp. 464-466.

Shen et al., "Bulk Glassy $Co_{43}Fe_{20}Ta_{5.5}B_{31.5}$ Alloy with High Glass-Forming Ability and Good Soft Magnetic Properties", Materials Transactions, 2001, vol. 42, No. 10, pp. 2136-2139.

Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, No. 13, pp. 2901-2904.

* cited by examiner

FIG. 5a
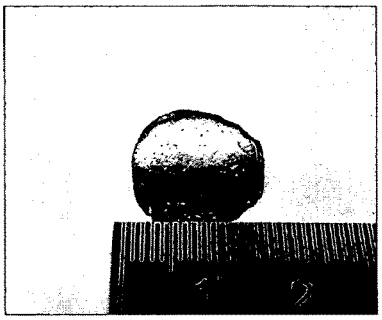
FIG. 5b
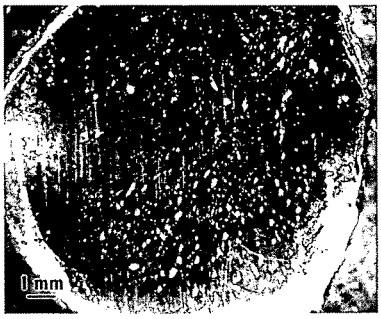
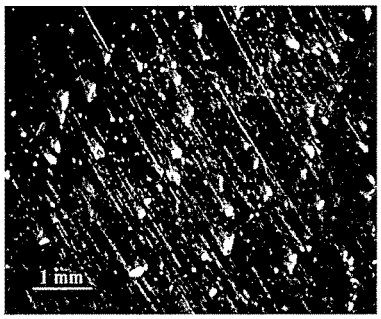
FIG. 5c
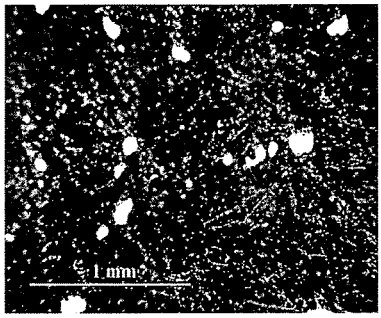
FIG. 5d

FIG. 7a
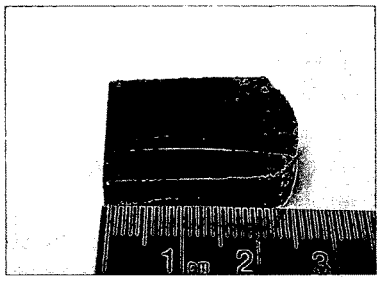
FIG. 7b
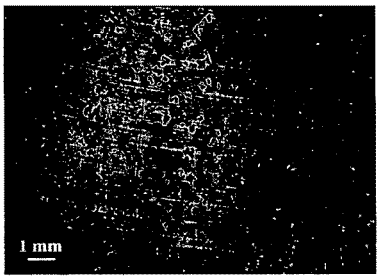
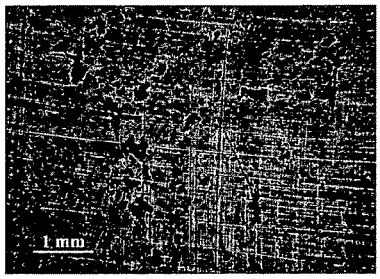
FIG. 7c
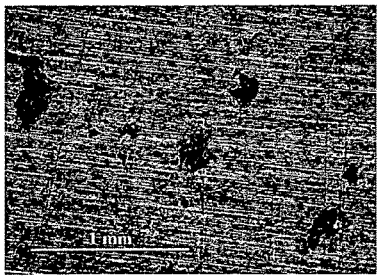
FIG. 7d

FIG. 9a
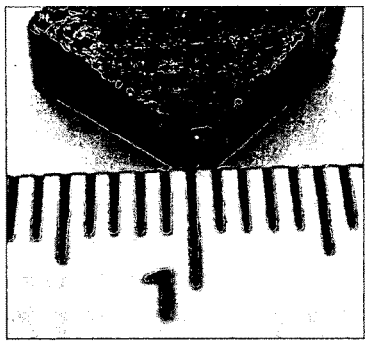
FIG. 9b
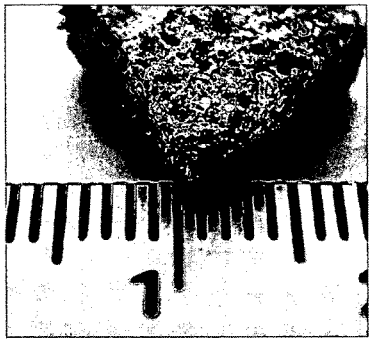
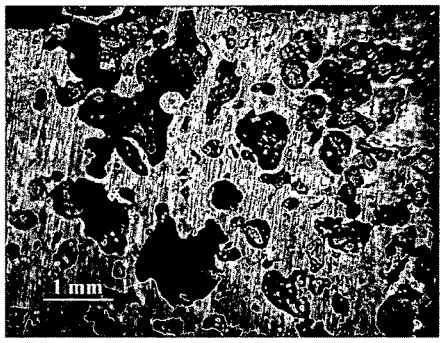
FIG. 9c
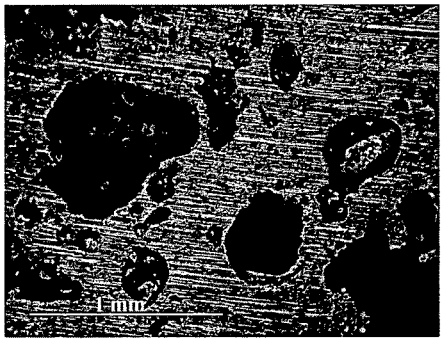
FIG. 9d

PRODUCTION OF AMORPHOUS METALLIC FOAM BY POWDER CONSOLIDATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The current application claims priority to U.S. Provisional Application No. 60/645,638, filed Jan. 21, 2005, the disclosure of which is incorporated herein by reference.

FIELD OF THE INVENTION

The current invention is directed to a method of producing amorphous metallic foams; and more particularly to methods of producing amorphous metallic foams by employing powder-consolidation.

BACKGROUND OF THE INVENTION

It has long been desirable to engineer metallic foam materials. Metallic foam structures (metallic solid foam or metallic cellular solids) are known to have interesting combinations of physical properties. Metallic foams offer high stiffness in combination with very low specific weight, high gas permeability, and a high energy absorption capability. As a result, these metallic foam materials are emerging as a new engineering material. However, metals in their crystalline state exhibit poor plasticity, and the plastic deformation that can be accomplished during the production of these crystalline metallic foams is also limited. Researchers have attempted to overcome the problems of mechanical failures due to dislocations and grain boundaries, and to produce desirable magnetic and electrical properties by producing foams out of metallic glasses through the rapid quenching of thin streams of amorphous material.

Indeed, it has been about 30 years since Paul Duwez and colleagues demonstrated that metallic glasses from the melt can be produced using his "gun technique" if the quench rate was sufficiently rapid (e.g., .about.$10^6$ K/S) (See P. Duwez, R. H. Willens, and W. Klement, Jr., J. Appl. Phys. 31, 135 (1960)). Since that time much experimental and theoretical work has disclosed the conditions necessary to produce and maintain the metallic glass ("amorphous") state. David Turnbull has been among the leaders in the field. His work in the late 40's with metal alloy (mercury) drops and that of Vonnegut with oxide coated tin drops demonstrated that the undercooling of metallic materials followed a path similar to non-metallic materials. (See, e.g., D. Trumbull, J. Appl. Phys. 20, 817 (1949) and B. Vonnegut, J. Colloid Sci. 3, 563 (1948)). Deep undercoolings were possible if heterophase nucleants were either absent or neutralized. Even relatively large samples (e.g. a few grams) could be undercooled if nucleants were removed by appropriate fluxing techniques.

However, in order for a glass to form, the melt must reach the glass forming temperature, $T_g$, before crystal nucleation can occur. The material must thus undercool below the liquidus temperature, $T_1$, in order to reach $T_g$. The reduced glass temperature ratio $T_{rg}=T_g/T_1$ becomes an important parameter. For example, when produced by solidifying the molten alloy into a solid state, the structure of these alloys becomes to be amorphous only at high cooling rates of around 1-250 K/s. Moreover, even with these high cooling rates, the maximum size attainable by this method is around 10 mm in diameter.

In light of these manufacturing constraints, the production of metallic foamed structures is generally carried out in the liquid state above the melting temperature of the material. The foaming of ordinary metals is challenging because a foam is an inherently unstable structure. The reason for the imperfect properties of conventional metallic foams comes from the manufacturing process itself. For example, although a pure metal or metal alloy can be manufactured to have a large volume fraction (>50%) of gas bubbles, a desired bubble distribution cannot be readily sustained for practical times while these alloys are in their molten state. This limitation also results in difficulties in attempts to produce continuously cast parts with different thicknesses and dimensions. Specifically, the time scales for the flotation of bubbles in a foam scales with the viscosity of the material. Most conventional alloys have a very low viscosity in the molten state. Accordingly, the mechanical properties of these foams are degraded with the degree of imperfection caused by the flotation and bursting of bubbles during manufacture. In addition, the low viscosity of commonly used liquid metals results in a short time scale for processing, which makes the processing of metallic foam a delicate process.

In order to remedy these shortcomings, several techniques have been attempted. For example, to reduce the sedimentation flotation process, Ca particles may be added to the liquid alloy. However, the addition of Ca itself degrades the metallic nature of the base metal as well as the resultant metallic foam. Alternatively, foaming experiments have been performed under reduced gravity, such as in space, to reduce the driving force for flotation; however, the cost for manufacturing metallic foams in space is prohibitive.

One promising technique would appear to be powder consolidation. U.S. Pat. No. 3,087,807, the disclosure of which is incorporated herein by reference, teaches a method which permits the manufacture of a porous metal body of any desired shape. According to this method, a mixture of a metal powder and a propellant powder is cold-compacted at a compressive pressure of at least 80 MPa in a first step. Subsequent extrusion molding reshapes it at least 87.5%. This high degree of conversion is necessary for the friction of the particles with one another during the shaping process to destroy the oxide coatings and bond the metal particles together. The extruded rod thus produced can be foamed to form a porous metal body by heating it at least to the melting point of the metal. Foaming can be performed in various molds so that the finished porous metal body has the desired shape.

However, no one has successfully made an amorphous metallic foam through consolidation with an amorphous metallic powder. The reason for this is that many current powder consolidation techniques require the use of very high temperatures for compacting and bonding of the metal particles, and the temperature cannot be set at an arbitrary level, as is often required to maintain the amorphous qualities of the amorphous powders.

For example, U.S. Pat. No. 4,523,621 discloses a method for making amorphous powder and consolidating this powder by a hot extrusion. In this example, powders are made by a gas atomization method under the rapid solidification condition. Amorphous powder selected from them is contained in a Cu container and sealed. Then, the amorphous powder is consolidated beyond the amorphous transition temperature by a hot extrusion or a hot forging to obtain a bulk amorphous material without size limitation.

However, in the method described in the '621 patent, it is often difficult to consolidate the powder under the condition of maintaining the vitreous state. That is, in order to prevent crystallization in the amorphous alloy, extrusion ratio needs to be reduced. Furthermore, an oxide layer generally formed on the surface of the amorphous powders can reduce the bonding strength between the amorphous powders. Due to the disadvantages mentioned above, the product contains microvoids between the particles. In addition, in order to prevent the formation of the oxide layer, the entire fabrication processes should be carried out under an Ar gas or vacuum condition, thereby increasing the production cost. Further, after extrusion, the produced sample must be rapidly cooled to prevent crystallization.

Accordingly, a need exists for an improved method of manufacturing amorphous metallic foams.

SUMMARY OF THE INVENTION

This invention relates to the formation of amorphous metallic foams and in particular to a method of manufacturing such foams from particulate material. By foams the current invention means a substance having interstices or pores of unspecified size and occupied by gaseous matter, said interstices or pores being surrounded by solid constituents of the body.

In one embodiment of the invention, a method of manufacturing a porous body includes the stages of placing a quantity of amorphous metallic particulate material in a gas-tight container, evacuating said container, admitting to said container a gas, compacting said particulate material to form a compact within said container under a pressure which results in the particulate material being bonded together around discrete gas-containing pores and also reduces the volume of the initially formed pores within said compact so that the gas in said pores is at a higher pressure than that in the initially formed pores, and heat treating said compact at a temperature within a range which permits the pressure within said pores to exceed the material flow stress and thereby expand to provide a porous body. Each of these steps being carried out in such a way as to maintain the amorphous nature of the original powder material. In such an embodiment, the gas may be chosen from the group consisting of: helium, argon, air, nitrogen, and hydrogen.

In still yet another embodiment, the gas is preferably admitted to the container under a pressure (called the back-fill pressure) sufficient to enable a particular porosity to be achieved. For a particular material the gas may be admitted under an increased pressure if increased porosity in the finally formed body is required. Similarly, the pressure employed in compaction will vary with the percentage porosity required in the final body, a higher pressure being required for increased porosity for any given particular material, given back-fill pressure for one gas and given heat treatment process.

In still yet another embodiment, typical back-fill pressures employed (all in absolute atmospheres) may be in vacuums as low as those approaching space to over 100 atm. Following the compaction step the pressure within the pores may be increased to as much as 100, 1000 or 2000 atm or even greater. The greater the number of moles of gas compressed within the pore, the greater the amount of expansion of the pore on heat treatment. The pores could in fact become the majority phase in the porous body, and might occupy as much as 90% or more of the volume of the body. Typical hot isostatic compaction pressures are substantially equal to the pore pressure.

In another embodiment, the gas is produced via a gas producing or propellant material, which can be directly mixed with the amorphous metal powder. In such an embodiment, the propellant material can be chosen, for example, from the group consisting of: water vapor-releasing agents, hydrogen-releasing agents, carbon monoxide-releasing agents, carbon dioxide-releasing agents, and nitrogen-releasing agents.

In another embodiment, the particulate material may be any suitable amorphous metallic alloy which can exist in particulate form and be compacted so as to bond the particulate material together while maintaining its amorphous form. The material will also be required to have the capability of undergoing plastic deformation at the compression temperature so that it has a determinable flow stress. Flow stress is determinable for materials which are capable of plastic deformation above the yield of the material. Indeed, one advantage of the amorphous materials used in the current invention is that they enter a visco-elastic phase transition at temperatures well below those of conventional metals. Accordingly, the amorphous particulate material may be pre-compressed to some degree before it is placed in the container, as long as the gas can penetrate into its interior.

In still another embodiment, the method may be particularly suitable for the production of porous bodies of bulk solidifying amorphous metallic alloys.

In yet another embodiment, the compaction may be carried out under isostatic conditions and at above ambient temperatures (so-called hot isostatic pressing), but for suitable materials the invention may include compaction at ambient temperatures. Specifically, consolidation of the mixture is performed at a temperature below the crystalline transition temperature of the alloy. The consolidation process is performed at the highest possible temperature in order to promote visco-plastic deformation during powder consolidation. The consolidation process is performed for duration not exceeding the time for the crystalline transformation to take place, and is immediately followed by cooling in order to retain the amorphous state of the material.

In still yet another embodiment, following compaction, the compact may be cooled, typically to ambient temperature, but a pressure is preferably maintained at least until a temperature is reached below which the material will not yield.

In still yet another embodiment, the particulate material may include powders or granules or possibly larger particles. The particulate material may be of spherical or regular or irregular shape, and the particulate material placed into the gas-tight container may comprise particles of different sizes and shapes or particles of similar size and/or shape.

In still yet another embodiment, the evacuation or degassing of the contents of the container may be carried out at both ambient temperature and/or at an elevated temperature. Hot degassing may follow degassing at ambient temperature. When degassing is carried out at an elevated temperature, the container and its contents may be permitted to cool for a predetermined period before gas is introduced into the container.

In still yet another embodiment, the heat treatment may take place in the absence of any externally applied pressure other than atmospheric. In certain applications however the compact may be heat treated within an enclosure or cavity, such that on heating, the pore pressure causes the compact to expand into engagement with one or more walls of the enclosure or cavity. Heat treatment may be carried out with the compact at below atmospheric pressure, the body being permitted to cool prior to its subsequently being exposed to ambient pressure.

In still yet another embodiment, a skin or external layer of material identical to or different from the compact may be bonded to the compact prior to heat treatment, such that said skin or layer is caused to expand during said heat treatment under the pressure arising from the expansion of the compact. The skin may be formed by the container in which the particulate material is subjected to compaction.

In still yet another embodiment, any suitable compaction technique may be used with the current invention, including: hot pressing, hot extrusion, hot forging, hot rolling, and dyna-packing.

In still yet another embodiment, expansion of the consolidated amorphous precursor into foam is performed in the softened state of the alloy, which forms between the amorphous transition and the crystalline transition of the alloy. The expansion process is performed at the highest possible temperature in order to promote visco-plastic deformation during bubble expansion. The expansion process is performed at the lowest possible ambient pressure in order to promote the expansion driving force arising from difference between the stored gas pressure and the ambient pressure. The expansion process is performed for duration not exceeding the time for the crystalline transformation to take place, and is immediately followed by cooling in order to retain the amorphous state of the material.

In still yet another embodiment, the compact may also be mechanically worked after compaction but prior to heat treatment to change the shape of the originally formed pores e.g., to elongate them, such that on heat treatment greater expansion takes place in one dimension than in the others. Such elongation could be achieved e.g. by hot rolling or extrusion.

In still yet another embodiment, the heat treatment period may be varied to give varying degrees of porosity for identical materials having previously received identical treatment e.g., identical back-fill pressure of the same inert gas and identical isostatic pressing.

In still yet another embodiment, the pores of the compact are such as to not interconnect with one another, although upon heat treatment some of the pores may expand to merge with one another so that the porous body may have pores of varying size within it. With porosity levels of the order of 50%, such pores occupy half the volume of the body and it may be that some of the pores have merged to provide cavities of a substantial size.

The invention is also directed to bulk amorphous foams made in accordance with the processes of the current invention.

BRIEF DESCRIPTION OF THE DRAWINGS

Other objects and advantages of the invention will be evident to one of ordinary skill in the art from the following detailed description made with reference to the accompanying drawings, in which:

FIGS. 5a to 5d show photographs of compacted foam precursors made in accordance with the gas-filled embodiment of the current invention;

FIGS. 7a to 7d show photographs of compacted foam precursors made in accordance with the propellant producing particulate embodiment of the current invention;

FIGS. 9a to 9d show photographs and micrographs of an exemplary section of material prior to and then after foam expansion.

DETAILED DESCRIPTION OF THE INVENTION

The current invention is directed to a method of manufacturing amorphous metallic foams by consolidating amorphous metallic particulates under a high-pressure gas atmosphere, or blended with gas-releasing agent particulates.

The method of the current invention, constitutes an improvement over the existing methods of producing amorphous metallic foams, such as by introducing gas bubbles to a liquid metal at a temperature above the liquidus temperature of the alloy and then quenching the metal to form an amorphous precursor foam, because in the proposed method the volume fraction as well as the spatial and size distribution of gas-formed pores can be effectively controlled by the size distribution of the powder particulates. Another improvement of the proposed method over the existing one is that the interaction between the alloy and the gas or gas-releasing agent occurs in the softened state rather than in the liquid state, and consequently, the temperature is lower and the reactivity between the alloy and the gas or gas-releasing agent is suppressed. A further improvement is that in the proposed method, no limitations on the size of the produced precursor are imposed. In contrast, in the existing method the precursor is rendered amorphous by quenching from the liquid state, and consequently limitations on the size of the produced precursor are imposed by the rate of heat removal. The proposed method also constitutes an improvement because the softened state of the amorphous metals used in the current application possess visco-plastic properties, which can be utilized to accomplish higher plastic deformation during consolidation as well as during expansion.

Method of Forming Amorphous Metallic Foams

Figure 1:
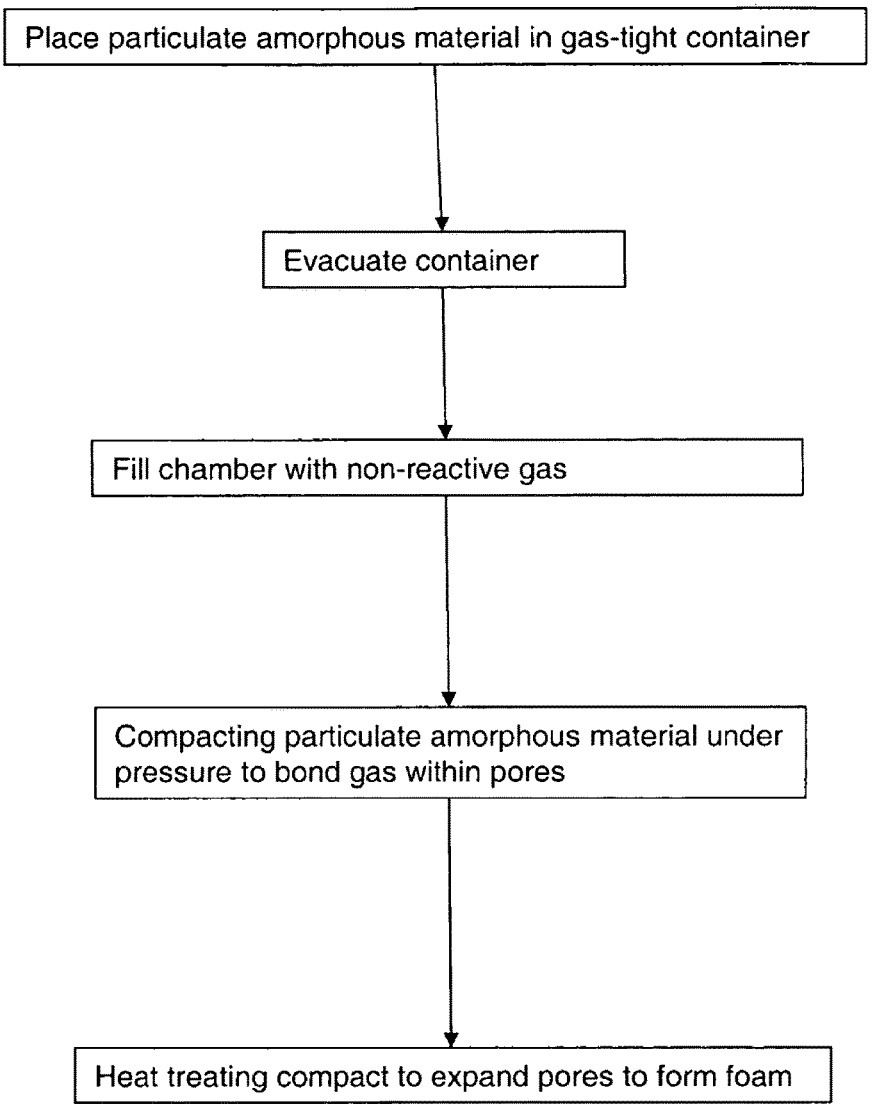
FIG. 1 shows a flow chart of an exemplary method of forming an amorphous foam in accordance with the current invention.

The method of the current invention basically involves three separate steps: powder consolidation, pore closure, and foam expansion. However, the method of actual consolidation can take many forms. Specifically, in one embodiment, as discussed above, the amorphous metallic particulate material is placed in a gas-tight container, the container is evacuated, and a non-reactive gas admitted. The particulate amorphous material is then compacted to form a compact within said container under a pressure which results in the particulate material being bonded together around discrete gas-containing pores. This step also reduces the volume of the initially formed pores within said compact so that the gas in said pores is at a higher pressure than that in the initially formed pores, and heat treating said compact at a temperature within a range which permits the pressure within said pores to exceed the material flow stress and thereby expand to provide a porous body. Each of these steps, as will be discussed further below, being carried out in such a way as to maintain the amorphous nature of the original powder material. A flow chart of these steps is provided in FIG. 1.

As discussed, the gas is preferably admitted to the container under a pressure (called the back-fill pressure) sufficient to enable a particular porosity to be achieved. For a particular material the gas may be admitted under an increased pressure if increased porosity in the finally formed body is required. Similarly, the pressure employed in compaction will vary with the percentage porosity required in the final body, a higher pressure being required for increased porosity for any given particular material, given back-fill pressure for one gas and given heat treatment process. Typical back-fill pressures employed (all in absolute atmospheres) may be in vacuums as low as those approaching space to over 100 atm. Following the compaction step the pressure within the pores may be increased to as much as 100, 1000 or 2000 atm or even greater. The greater the number of moles of gas compressed within the pore, the greater the amount of expansion of the pore on heat treatment. The pores could in fact become the majority phase in the porous body, and might occupy as much as 90% or more of the volume of the body. Typical hot isostatic compaction pressures are substantially equal to the pore pressure.

Figure 2:
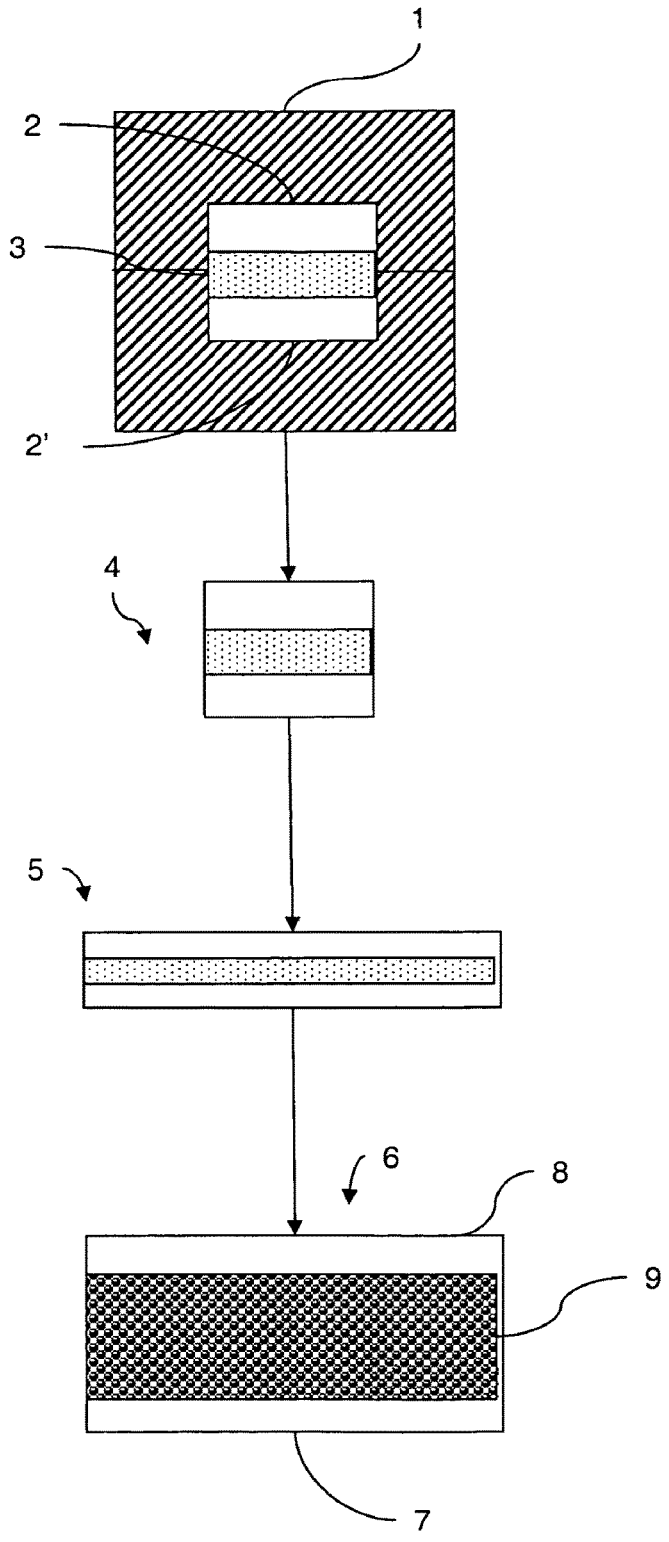
FIG. 2 shows the production of a foamable integrated amorphous metal body in a mold.

Although non-reactive gases may be used, in an alternative embodiment the gas is produced from propellant materials. In one exemplary embodiment of this method, as shown in FIG. 2, a layer (2) of propellant-free metal powder is placed in a hot molding device (1), after which a layer of propellant-containing metal powder (3) is added and finally another layer (2') of propellant-free metal powder. The mixture is plastically worked by a hot extrusion or a hot forging, and is thereby consolidated or compacted. After the compacting method according to the invention has been performed, a blank (4) is obtained, which may be further shaped into another body (5). The consolidated or compacted products or blank (4) contain small amount of micro-voids and show enhanced inelastic elongation and fracture toughness, compared to those of the monolithic. Further, with this composite structure, the amorphous material can be fabricated to be bigger and versatile in size, thereby manufacturing large-sized products with high quality and high strength. This body can then be foamed to form yet another body (6). The propellant-free metal layers each form a solid, less porous bottom layer (7) or cover layer (8) between which a highly porous metal foam layer (9) is located.

It should be understood that although a general method of producing a foam in accordance with the current invention is described above, that variations and modifications in the proposed method can exist with respect to the method of powder consolidation, the composition of amorphous alloy, or the composition of gas or gas-releasing agent.

Figure 3:
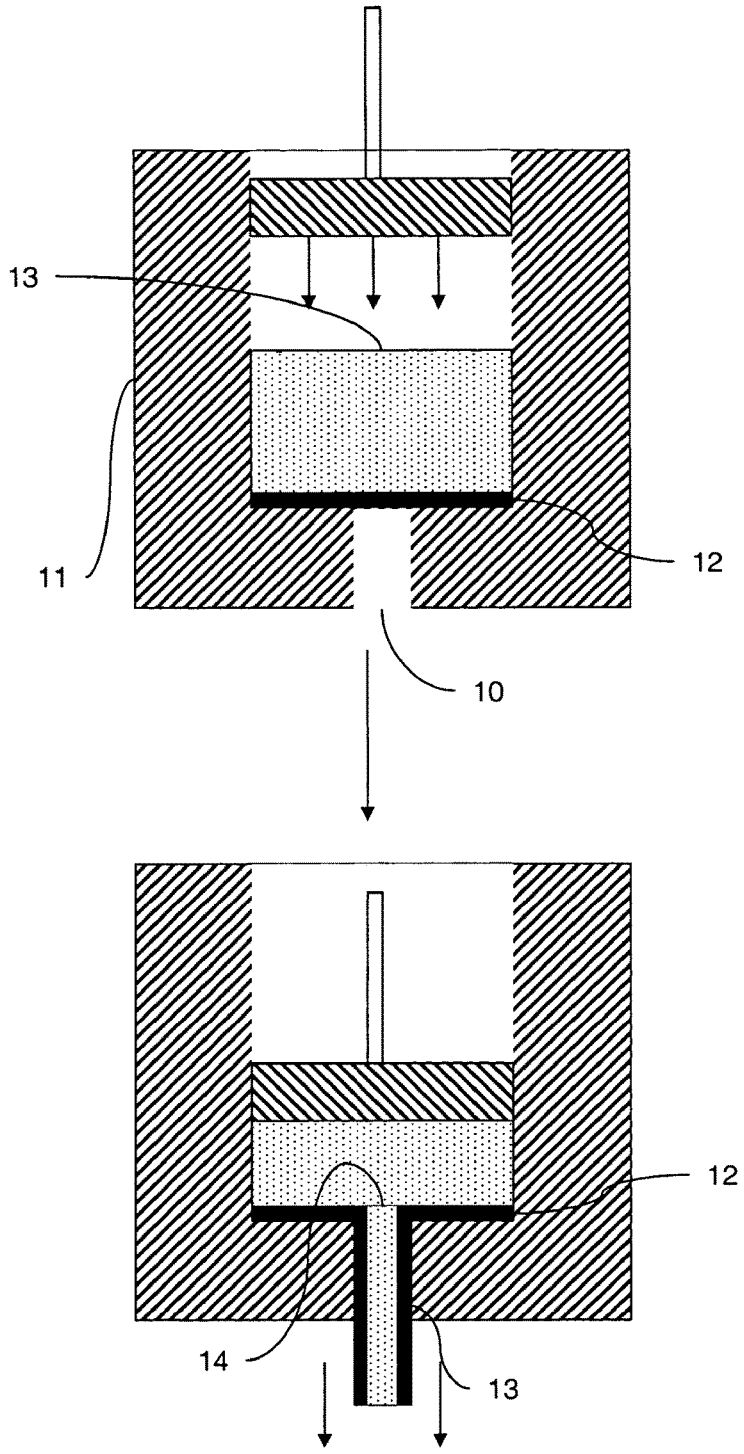
FIG. 3 shows the method for manufacturing a foamable integrated amorphous metal body by extrusion molding.

For example, other compaction techniques well-known in the art can be used including, hot pressing, hot extrusion, hot forging, hot rolling, and dyna-packing. A few exemplary embodiments of these techniques are disclosed below. For example, in one exemplary embodiment, the amorphous powder material is compacted using a hot extrusion technique, as shown in FIG. 3. In this case opening (10) of an extrusion-molding tool is initially covered by a disk of solid metal (12). Then the molding chamber of the tool is filled with propellant-containing powder (13) and the powder mixture is subjected to a pressure of about 60 MPa. By heating the tool together with powder mixture (13), the latter is compressed. Then the compression pressure is set such that the central area of solid metal plate (12) which blocks opening (10) of the tool flows through this opening and thus exposes it. During subsequent stages of the compression process the foamable semi-finished product (14) together with solid material (12) is forced through opening (10), whereby solid material (12) surrounds the foamable body in the form of an outer layer (13). After the foaming of this combined body, a less porous layer surrounds a core made of highly porous foamed metal.

Figure 4:
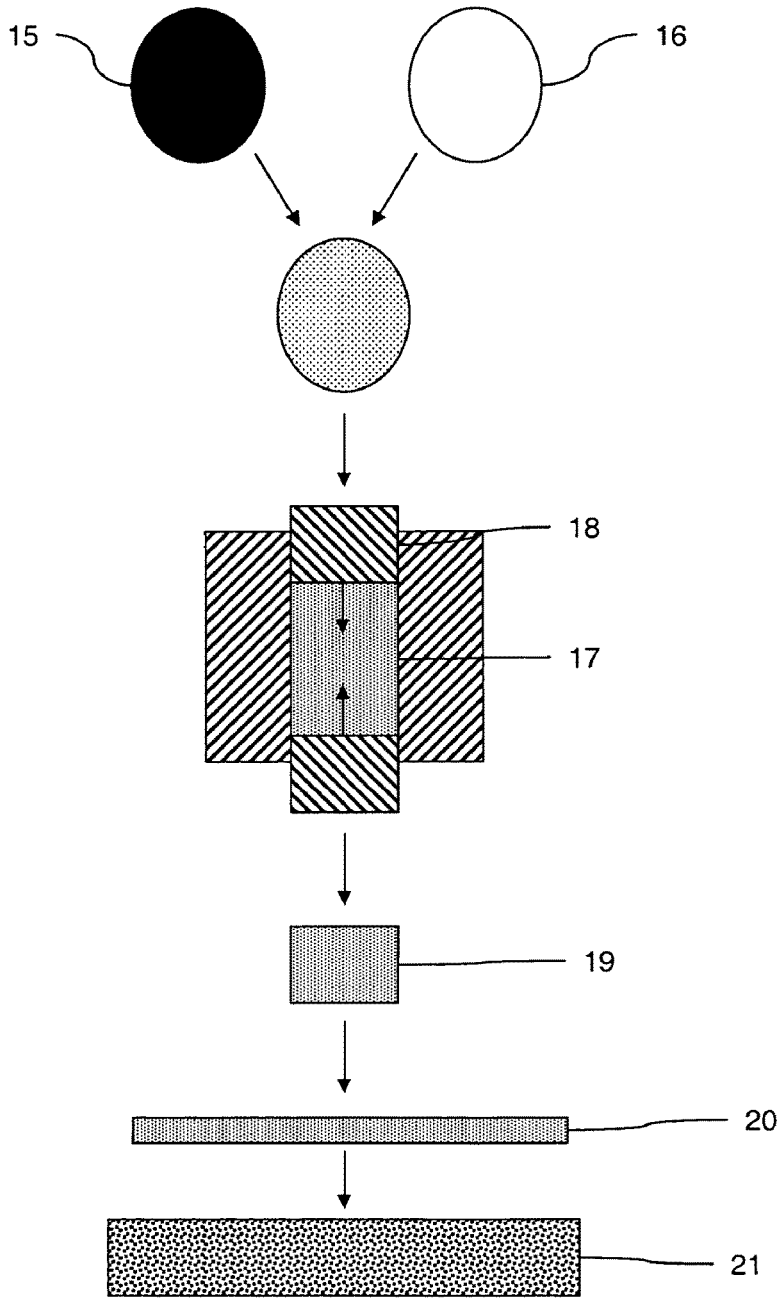
FIG. 4 provides a schematic diagram of the method according to the invention and its use.
Figure 6A:
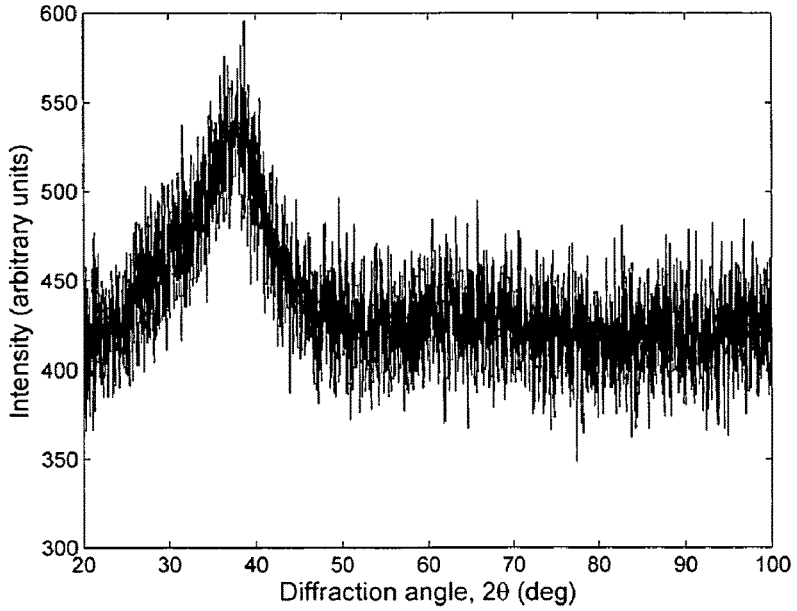
FIGS. 6a and 6b show data from experiments on the compacted foam precursors shown in FIG. 5.
Figure 6B:
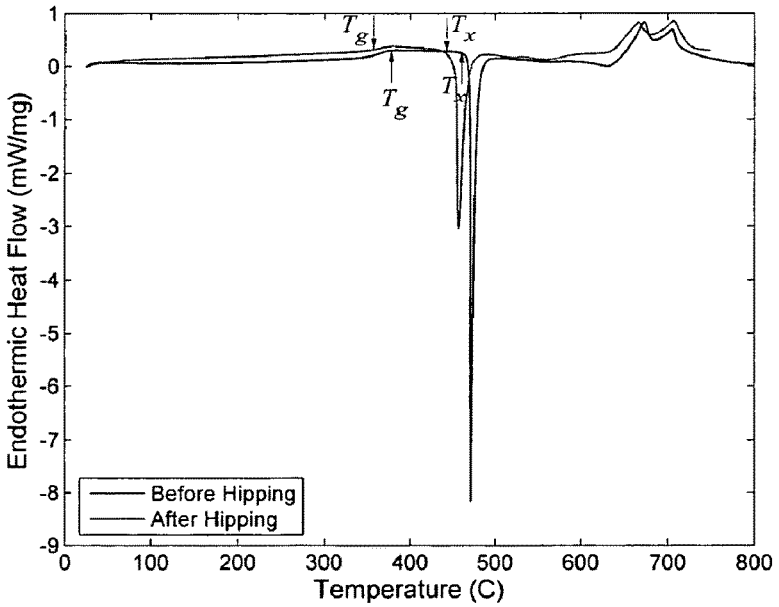
Figure 8A:
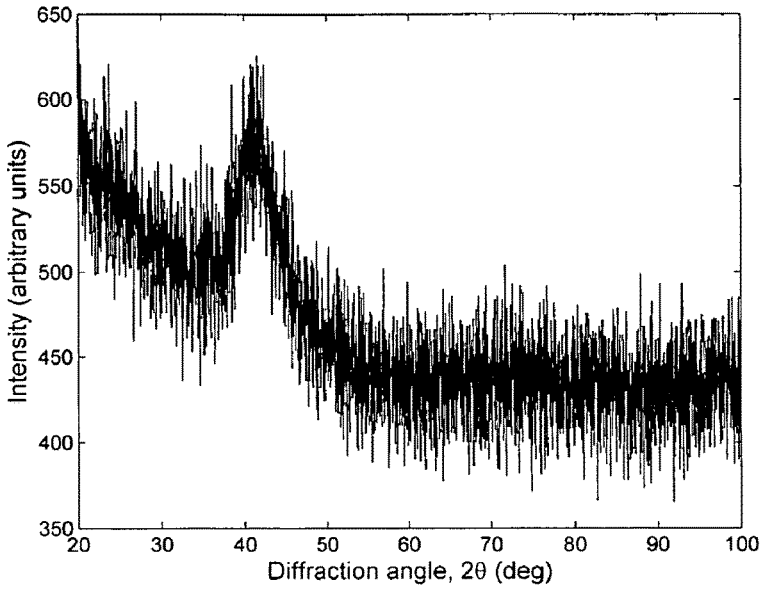
FIGS. 8a and 8b show data from experiments on the compacted foam precursors shown in FIG. 7.
Figure 8B:
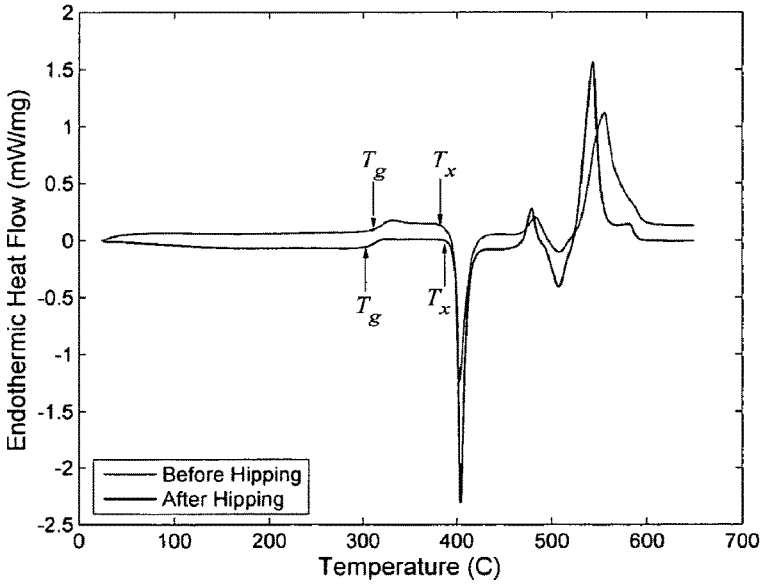

In another embodiment, hot pressing, as shown in FIG. 4, may be used. In such an embodiment of the invention a metal powder (15) is intensively mixed with a propellant powder (16). Resultant mixture (17) is compacted in a press (18) under pressure and temperature. After compacting the result is a semifinished product (19). Semifinished product (19) can be shaped for example into a sheet (20). Then sheet (20) can be foamed under the influence of temperature to produce a finished porous metal body (21).

Another method for manufacturing foamable metal bodies is rolling, at high temperature, a powder mixture consisting of at least one metal powder and at least one propellant powder. This produces a bonding of the metal and propellant powder particles in the roller nip. For the individual skilled in the art, this has the surprising result that diffusion between the particles takes place at low temperatures to a sufficient degree. These processes occur especially in the surface layers. In particular, the measure of intermediate heating of the pre-rolled material following the individual roll passes has been found to be significant since the creation of edge cracks can be largely avoided as a result. Another method for manufacturing foamable metal bodies is rolling, at high temperature, a powder mixture consisting of at least one metal powder and at least one propellant powder. This produces a bonding of the metal and propellant powder particles in the roller nip. The temperature range between 300° C. and 400° C. has been found to be especially advantageous. In particular, the measure of intermediate heating of the pre-rolled material following the individual roll passes has been found to be significant since the creation of edge cracks can be largely avoided as a result. As will be more thoroughly discussed below; however, the specific temperature and pressure ranges used for the current invention will depend primarily on the amorphous material used, and the temperature at which it becomes crystalline.

To accomplish the goal of full "enclosure" of the gas particles, in one embodiment of the invention the propellant filled amorphous alloy powder may be surrounded by a propellant less amorphous alloy powder, such that upon compaction the propellant material is encased in propellant-less material. One special advantage of the method according to the invention consists in the fact that it is now possible to make bodies that have densities that change continuously or discontinuously over their cross sections, or so-called graduated materials. In this connection, an increase in density toward the edge of the foamable body is preferred, since this is where the primary stress occurs. In addition, a foamable body with a solid cover layer or a cover layer of higher density offers advantages as far as interlocking and connecting with similar or different materials is concerned. If the hot-compacting process is performed in a mold, with the powder mixture surrounded completely or partially by a propellant-free metal or metal powder, the propellant-free metal layers form a solid, less porous outer layer or bottom layer or cover layer, between which a layer is located which forms a highly porous metal foam layer after a foaming process. By producing the foamable metal body in such a way that a propellant-free metal piece is placed in front of the powder mixture and the powder mixture is then extrusion-molded, a foamable body is produced which is compressed together with the solid material, and the solid material surrounds the foamable body in the form of an outer layer.

A suitable choice of method parameters, such as, temperature and pressure, ensures that a body is produced which has a gas-tight structure. In addition, the fact that the gas remains "enclosed" between the metal particles prevents it from escaping prematurely from the compacted body. Hence, the amounts of propellant required are small. Thus, propellant quantities on the order of several tenths of a percent by weight are sufficient because the compacted body is completely compressed and the propellant gas cannot escape. Propellant quantities of 0.2 to 1% have proven to be especially advantageous. Only the amount of propellant need be added which is necessary to produce a foam structure. In fact, higher metal-to-propellant ratios could be disadvantageous, as exceeding the threshold for grain-boundary percolation (typically 15% by volume if the agent-to-metal powder size ratio is one, and much less for fractional size ratios) would result in the formation of continuous gaseous paths in the consolidated product, which would render the precursor incapable to be foamed. This results in a cost saving. It is also advantageous that because of the selected high temperature and the use of high pressure, the compacting process occurs in a short period of time.

Other exemplary methods of compaction and expansion can be found in the following prior art references, the disclosures of which are incorporated herein by reference: U.S. Pat. Nos. 4,659,546, 5,151,246, and 6,669,899; International Publication Number WO 2004/076099 A2; and publications to Kearns, M. W., Blenkinsop, P. A., Barber, A. C., and Farthing, T. W., 1988, "Manufacture of a Novel Porous Metal," Int. J. Powder Metall. Vol. 24, pp. 59-64, Ohtera, K., Inoue, A., and Masumoto, T., 1991, "High Mechanical Strength of Aluminum-Based Crystalline Alloys Produced by Warm Consolidation of Amorphous Powder," Mater. Sci. Eng. A, Vol. 134, pp. 1212-1214, Kunze, H. D, Baumeister, J, Banhart, J., Weber, M., 1993, "P/M Technology for the Production of Metal Foams," Powder Metall. Int. Vol. 25, pp. 182-185, and Schroers, J., Veazey, C., Demetriou, M. D., and Johnson, W. L., 2004, "Synthesis Method for Amorphous Metallic Foam," J. Appl. Phys. Vol. 96, pp. 7723-7730.

In summary, regardless of the specific compacting method used, a mixture of one or more amorphous metal powders, and one or more propellant powders which can split gases or a back-filled gas is prepared initially. This intensively and thoroughly mixed powder mixture is compressed by hot pressing or hot isostatic pressing, or other suitable technique to form a compact gas-tight body. During the compacting process it is of critical importance to the invention that the temperature be high enough so that the bond between the individual metal powder particles is produced primarily by diffusion. In an embodiment in which a propellant powder is used, it is also important to select a pressure that is sufficiently high to prevent decomposition of the propellant, so that a compacted body is produced in which the metal particles are in a fixed relationship to one another and form a gas-tight seal for the gas particles of the propellant. Regardless of which method is used, the key is that the gas is "enclosed" between the metal particles bonded together so that the gas is released only in a later step in the foaming process.

In contrast to foams made of conventional metals and alloys; however, the current inventive method requires that the following additional temperature and time constraints be considered:

- Consolidation of the mixture must be performed at a temperature below the crystalline transition temperature of the amorphous alloy;
- Consolidation process should be performed at the highest possible temperature in order to promote visco-plastic deformation during powder consolidation; and
- Consolidation process is performed for duration not exceeding the time for the crystalline transformation to take place, and is immediately followed by cooling in order to retain the amorphous state of the material.

One advantageous feature of the method according to the invention is that after the hot compacting process is completed, both the action of heat and the action of pressure can be eliminated simultaneously. The still-hot metal body retains its shape although it is no longer subjected to the action of pressure. This means that the metal particles form such a tight seal for the propellant powder particles that no expansion of the propellant occurs even at high temperatures. The metal body thus formed is dimensionally stable and retains its shape even at high temperatures and without the action of pressure.

In another embodiment the method of the current invention takes advantage of the unique properties of the amorphous materials such that expansion of the consolidated amorphous precursor into foam is performed in the softened state of the alloy, which forms between the amorphous transition and the crystalline transition of the alloy. This allows for an expansion without the creation of the discontinuities and flaws inherent in crystalline materials. Again, to ensure the amorphous materials used in the current application retain their amorphous qualities, the expansion includes the following considerations:

- The foam expansion process is performed at the highest possible temperature in order to promote visco-plastic deformation during bubble expansion;
- The foam expansion process is performed at the lowest possible ambient pressure in order to promote the expansion driving force arising from difference between the stored gas pressure and the ambient pressure; and
- The foam expansion process is performed for duration not exceeding the time for the crystalline transformation to take place, and is immediately followed by cooling in order to retain the amorphous state of the material.
- In one embodiment, the amorphous material could be heated above the melting temperature of the material such that foam expansion would take place in a liquid state, however, in such an embodiment, the foamed piece would have to be rapidly cooled to prevent recrystallization of the material.

The heating rates of the semifinished product during the foaming process are within normal limits, in other words they are about 1° to 5° C. per second. High heating rates are not necessary since the gas cannot escape anyway. These usual heating rates are another feature of the invention that helps to lower cost. Of course, a high heating rate is advantageous in individual cases, for example to achieve small pore size.

After foaming, a cooling rate must be selected such that the amorphous material retains its amorphous properties and such that no further foaming action takes place that starts in the interior of the body and proceeds outward. Therefore, the cooling rate for large parts must be higher than for smaller ones; it must be adjusted to the volume of the sample.

In another embodiment of the current invention the foaming parameters, time and temperature, may be used to vary the density of the porous metal body. If the foaming process is interrupted after a certain time at a constant temperature, a certain density will be obtained. If the foaming process is continued longer, different density values will result. It is important that certain limits be observed: a maximum admissible foaming time must be observed which, if exceeded, will cause either the loss of the amorphous nature of the material or the loss of the propellant by percolation through coalesced cavities.

Although the above embodiments have focused on methods in which the particulate material is in an initial amorphous state, it should be understood that the particulate materials could be in a crystalline feedstock state. However, in such an embodiment, the particulate material would first have to be heated to above its melting temperature such that an amorphous transformation could take place. Then the material could be rapidly cooled, as discussed more thoroughly below, within the limits of time, temperature, and pressure such that recrystallization of the material is prevented.

Turning to the materials for use with the amorphous foam consolidation method of the current invention. It should be understood that any suitable combination of amorphous alloy and gas-releasing agent may be used. Specifically, the amorphous alloy may be chosen from any amorphous alloy family that forms a vitrified amorphous state that can relax to a supercooled liquid state before undergoing a crystalline transition. For the purposes of this invention, the term amorphous means at least 50% by volume of the alloy is in amorphous atomic structure, and preferably at least 90% by volume of the alloy is in amorphous atomic structure, and most preferably at least 99% by volume of the alloy is in amorphous atomic structure. Examples include, but not limited to alloys based on: Zr, Ti, Al, Fe, La, Cu, Mg, Pt and Pd.

One particularly preferred classification of amorphous alloys that may be used with the method of the current invention are bulk-solidifying amorphous alloys. Bulk solidifying amorphous alloys are amorphous alloys, which can be cooled at substantially lower cooling rates, of about 500 K/sec or less, than conventional amorphous alloys and substantially retain their amorphous atomic structure. As such, they can be produced in thickness of 1.0 mm or more, substantially thicker than conventional amorphous alloys, which have thicknesses of about 0.020 mm, and which require cooling rates of $10^5$ K/sec or more. U.S. Pat. Nos. 5,288,344; 5,368,659; 5,618,359; and 5,735,975 (the disclosure of each of which is incorporated herein by reference in its entirety) disclose such exemplary bulk solidifying amorphous alloys.

One exemplary family of bulk solidifying amorphous alloys can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages. Furthermore, those alloys can accommodate substantial amounts of other transition metals (up to 20% atomic), including metals such as Nb, Cr, V, Co. Accordingly, a preferable alloy family is $(Zr,Ti)_a(Ni,Cu)_b(Be)_c$, where a is in the range of from 40 to 75, b is in the range of from 5 to 50, and c in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metal (Fe, Ni, Co) based compositions. Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # .2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not as processable as Zr-base alloy systems, they can be still be processed in thicknesses around 1.0 mm or more, sufficient enough to be utilized in the current invention.

In general, crystalline precipitates in amorphous alloys are highly detrimental to their properties, especially to the toughness and strength of such materials, and as such it is generally preferred to limit these precipitates to as small a minimum volume fraction possible so that the alloy is substantially amorphous. However, there are cases where ductile crystalline phases precipitate in-situ during the processing of bulk amorphous alloys, which are indeed beneficial to the properties of bulk amorphous alloys especially to the toughness and ductility. The volume fraction of such beneficial (or non-detrimental) crystalline precipitates in the amorphous alloys can be substantial. Such bulk amorphous alloys comprising such beneficial precipitates are also included in the current invention. One exemplary case is disclosed in (C. C. Hays et. al, Physical Review Letters, Vol. 84, p 2901, 2000), the disclosure of which is incorporated herein by reference.

It should be understood that regardless of the actual amorphous material used, the crystalline transformation temperature of each of these alloys is well-known and is critical for the operation of the current invention. The temperature and pressure of the compacting and foam expansion processes must be controlled to prevent the amorphous material from undergoing a crystalline transition. Suitable temperatures and pressures can either be determined from the art, including that cited above, or from the "C"-curves for the respective materials. For example the crystalline and glass-transformation temperatures can be determined from standard DSC (Differential Scanning Calorimetry) scans at 20° C./min as is known in the art.

Likewise, any compatible gas releasing agent composition that decomposes below the crystalline transition temperature of the amorphous alloy to release a gas that does not interact with the alloy to substantially degrade its vitrifying ability or viscoplastic forming ability. Examples include, but not limited to: water vapor-releasing agents, hydrogen-releasing agents, carbon monoxide-releasing agents, carbon dioxide-releasing agents, and nitrogen-releasing agents.

Hence, propellants can be used whose decomposition temperatures are below the crystalline temperature. This measure according to the invention permits the use of propellants that can be selected only from the viewpoint of compatibility with the selected amorphous metal powder or from the viewpoint of economy of the method. The following are examples of materials that can be used as propellants: metal hydrides, for example titanium hydride, zirconium hydride, palladium hydride; carbonates, for example magnesium carbonate, calcium carbonate, potassium carbonate, sodium carbonate, and sodium bicarbonate; hydrates, for example aluminum sulphate hydrate, alum, and aluminum hydroxide, boron oxide hydrate, boric acid; or substances that evaporate readily, for example mercury compounds or pulverized organic substances.

In one advantageous embodiment, the invention provides that two or more propellants with different decomposition temperatures be mixed into the metal powder. When a foamable body made from this powder mixture is heated, the propellant with the lower temperature decomposes first, causing foaming. If the temperature is increased further, the propellant with the next higher decomposition temperature decomposes, causing further foaming. Foaming takes place in two or more steps. Metal bodies which can be foamed in stages as they expand have special applications, for example in fireproofing.

In terms of the high pressure gases used for injection during the compaction and expansion processes, any gas composition that does not interact with the alloy to substantially degrade its vitrifying ability or viscoplastic forming ability may be used. Examples include, but not limited to: helium, argon, air, nitrogen, and hydrogen.

To increase the strength of the metal bodies, the invention provides for the addition of reinforcing components in the form of fibers or particles of suitable material such as ceramic or the like. These are advantageously mixed with the starting powders. For this purpose, the starting materials and the foaming parameters in particular must be chosen such that good cross linking of the reinforcing components by the metal matrix is ensured. It is advantageous for the fibers or particles to be coated (with nickel for example). This ensures that the forces will be conducted from the metal matrix into the particles or fibers.

According to one embodiment, the method according to the invention provides for alignment of the reinforcement along a preferred direction if this can be accomplished by conversion of the foamable body. This conversion can be produced for example by extrusion presses or rollers.

Amorphous Foam Bodies

Although foaming of the semifinished product in accordance with the current invention takes place freely if no final shape is specified. Foaming can also take place in a mold. In this case the finished porous metal body takes on the desired shape. Accordingly, the current invention is also directed to molded bodies from porous amorphous metal material made in accordance with the methods set forth herein.

The metal body formed by foaming the resultant semifinished product has a predominantly closed porosity; such metal bodies float in water. The resultant pores are uniformly distributed throughout the entire metal body, and they also have approximately the same size. The pore size can be adjusted during the foaming process by varying the time during which the metal foam can expand. The density of the porous metal body can be adjusted to suit requirements. This can be accomplished not only by suitable selection of the foaming parameters as already described but also by suitable addition of propellant or gas. The strength and ductility of the porous metal body can be varied by choosing the parameters temperature and time under which the foaming takes place. These two properties are modified in any event by adjusting the desired pore size. Of course the properties of the finished metal body depend primarily on the choice of the starting materials.

The moldability of the compacted semifinished product is comparable to that of the solid starting metal. The semifinished product does not differ from the starting metal, even in external appearance. The semifinished product therefore can be processed by suitable shaping methods to produce semifinished products of any desired geometry. It can be shaped into sheets, sections, etc. It lends itself to nearly any shaping method which occurs with the decomposition temperature of the propellant and the crystallization temperature of the amorphous material in mind. It is only when the semifinished product is heated during the shaping process to temperatures above the decomposition temperature of the propellant used, that foaming occurs. It is also only when the crystallization temperature is reached that the material will lose its amorphous properties The foamable metal body produced by the method according to the invention can be used to produce a porous metal body. This is accomplished by heating the foamable body in the temperature range of the softened state of the amorphous alloy to enable visco-plastic deformation, and in the case of the use of a propellant, above the decomposition temperature of the propellant, whereupon the gas is released, and then cooling the body thus foamed.

If a body produced according to one embodiment of the invention is used to produce a porous metal body, a less porous outer layer may be used to surround a core of highly porous foamed metal after foaming. Another use of the foamable body is to produce metal foams with solid outer layers. The foamable body is then initially shaped into a cylindrical rod by suitable shaping methods; this rod is inserted into a cylindrical tube and then foamed. This method can also be applied to other hollow shapes and molded parts. It is also possible to make an integrally foamed body by restricting the expansion of the foamable body by solid walls. As soon as the surface of an initially freely expanding foam contacts the walls, the pores near the surface are flattened by the internal pressure of the material which continues to foam from the interior so that the initially highly porous outer edge of the molded part is compressed once more. The thickness of this outer edge, which has a density higher than that of the interior of the workpiece, can be controlled by means of the period of time during which, after contact with the walls, the material is allowed to continue foaming from inside before the molded part is finally cooled, causing the subsequent foaming to stop.

Finally, methods are possible in which the surface of the body which is foamable according to the invention or the surface of the expanding foam can be kept from foaming as much as in the noncooled areas, by cooling it. Cooling can then be accomplished by suitable cooling media or by contact with cold materials. Cooling can act upon the entire surface or only on partial areas.

Integral foam-type metal bodies can be produced by gluing a metal foam to similar or different materials. In addition to gluing, other joining and fastening methods may be used (soldering, welding, or screwing). Finally, a metal foam can also be potted in metal melts or other initially liquid and then rigid or hardening materials.

EXAMPLES

In the following examples, the pattern of the method according to the invention and a use of the foamable body produced by the method according to the invention will be discussed:

FIGS. 5 to 8 show photographs and data from foam compacted foam precursors made in accordance with the current invention. The foam precursor shown in FIGS. 5a to 5d were made in accordance with the gas back-filled method described above. Specifically, the pieces were made by hot isostatic pressing of amorphous metallic particulates under a high-pressure gas atmosphere. The amorphous metallic material powder was a Zr-based alloy having a molecular formula of $Zr_{44}Ti_{11}Cu_{10}Ni_{10}Be_{25}$, the particulates were flakes, having dimensions of 5 mm'5 mm'100 μm, the hipping temperature was about 350° C., the hipping pressure was around 15,000 psi, and the hipping time was around 2 hrs. The porosity of the consolidated material was about 0.15%. The gas used in this embodiment was Argon, at a pressure of about 1 atm. FIGS. 6a and 6b, meanwhile, show X-ray diffraction and heat flow data that indicate that the amorphous properties of the particulate metal material was unaltered after the compacting process.

The foam precursor shown in FIGS. 7a to 7d were made in accordance with the propellant material method described above. Specifically, the pieces were made by hot isostatic pressing of amorphous metallic particulates blended with gas-releasing agent particulates. The amorphous metallic material powder was a Pd-based alloy having a molecular formula of $Pd_{43}Ni_{10}Cu_{27}P_{20}$, the particulates were powdered, having dimensions of 590 μm, the gas releasing agent was $MgCO_3$, in the form of a powder with particle sizes of <1 μm. The ratio of metal to agent was 5% by volume. The porosity of the consolidated material was about 5%. The hipping temperature was about 290° C., the hipping pressure was around 30,000 psi, and the hipping time was around 2 hrs. The data in FIGS. 8a and 8b, meanwhile, show X-ray diffraction and heat flow data that indicate that the amorphous properties of the particulate metal material was unaltered after the compacting process.

The images shown in FIGS. 9a to 9d meanwhile show a precursor before and after foaming. Specifically, FIG. 9a shows a photograph of a section of the foam precursor prior to expansion. FIG. 9b, shows the same section of the precusor after expansion. As shown, after expansion the precursor is formed into a 50%-porosity foam. Theis expansion was accomplished by heating the precursor at about 350° C. under vacuum. Note that differential foaming was achieved in this sample as the central part of the precursor experienced a higher pressure during consolidation which resulted in full enclosure of the gas-releasing particulates. Finally, FIGS. 9c and 9d provide micrographs of the sectioned foam at low and high magnification, respectively. These micrographs can be contrasted with those supplied for the compacted precursor in FIG. 7.

Accordingly, the above examples show that using the methods of the current invention, a foaming precursor having well-defined pore size can be formed by compacting two very different amorphous alloy powder materials using with a high pressure gas or gas releasing agent method without destroying the amorphous properties of the materials, and that this precursor can be successfully expanded to form a porous foam material.

Although specific embodiments are disclosed herein, it is expected that persons skilled in the art can and will design alternative continuous foam sheet casting apparatuses and methods to produce continuous amorphous alloy foam sheets that are within the scope of the following claims either literally or under the Doctrine of Equivalents.

What is claimed is:

1. A method of forming an amorphous metal foam formed of an amorphous metal powder comprising:

mixing at least one amorphous metal powder and at least one gas-splitting propellant powder into a propellant filled amorphous metal powder mixture, such that upon decomposition of the gas-splitting propellant powder, gas-containing pores are created within the amorphous metal powder mixture;

compacting the mixture such that the amorphous metal powder particles are bonded to one another to form a gas-tight seal around the gas-splitting propellant powder particles, the mixture being compacted at a compacting temperature and pressure sufficient to allow for bonding of the mixture, wherein the temperature is below any crystalline transition temperature of the amorphous metal powder, and for a duration not exceeding a time for any crystalline transformation of said amorphous metal powder at the compacting temperature and pressure;

cooling the compacted mixture at a cooling rate sufficient that the amorphous metal powder mixture remains amorphous;

expanding the compacted amorphous metal powder mixture to form a foam material, said expansion being conducted at an expansion temperature below any crystalline transition temperature of the amorphous metal powder, but sufficiently high to allow bubble expansion, at a surrounding pressure sufficient to promote expansion arising from a difference between a pressure in the gas-containing pores and the surrounding pressure, and for a duration not exceeding the time for any crystalline transformation to take place; and cooling the expanded foam material in order to allow the foam material to remain amorphous.

2. The method according to claim 1 wherein the gas-splitting propellant powder decomposes during expansion.

3. The method according to claim 1 wherein the gas-splitting propellant powder decomposes during compaction.

4. The method according to claim 1 wherein heat and pressure are simultaneously suspended after the compacting and cooling of the compacted mixture takes place without the influence of pressure.

5. The method according to claim 1 wherein the powder mixture further comprises strength reinforcing components.

6. The method according to claim 5 wherein the compacting is followed by aligning the strength reinforcing components.

7. The method according to claim 1 wherein the compacting is performed by a method selected from the group consisting of: hot pressing, hot extrusion, hot forging, hot rolling and dyna-packing.

8. The method according to claim 1 wherein the amorphous metal powder is selected from the group consisting of Zr based alloys, Ti based alloys, Al based alloys, Fe based alloys, La based alloys, Cu based alloys, Mg based alloys, Pt based alloys and Pd based alloys.

9. The method according to claim 1 wherein at least two different gas-splitting propellant powders with different decomposition temperatures are used.

10. The method according to claim 1 wherein the compacting takes place in a mold such that the powder mixture is completely or partially surrounded by a propellant-free metal or amorphous metal powder.

11. The method according to claim 1 wherein the compacting is accomplished by extrusion molding, with the powder mixture being piled against a propellant-free metal piece.

12. The method according to claim 1 wherein a porous metal body is made by expanding the compacted mixture, said expansion being conducted at an expansion temperature below any crystalline transition temperature of the amorphous metal but above a glass transition temperature of the amorphous metal powder, followed by cooling of the porous metal body to thereby form a foam.

13. The method according to claim 1 wherein a porous metal body is made by expanding the compacted mixture, said expansion being conducted at an expansion temperature below any crystalline transition temperature of the amorphous metal powder, whereby during expansion of the compacted mixture, different temperature and time values are used as a function of a density of the porous metal body to be produced, followed by cooling of the porous metal body to thereby form a foam.

14. The method according to claim 1 wherein a porous metal body is made by expanding the compacted mixture, said expansion being conducted at an expansion temperature below any crystalline transition temperature of the amorphous metal powder, with a heating rate being between 1° and 5° C./sec, followed by cooling of the porous metal body at a rate sufficient to interrupt further foaming of the porous metal body.

15. The method according to claim 1 wherein the gas-splitting propellant powder is selected from the group consisting of: water vapor-releasing agents, hydrogen-releasing agents, carbon monoxide-releasing agents, carbon dioxide-releasing agents, and nitrogen-releasing agents.

16. The method of claim 1, further comprising forming the amorphous metal particles prior to the mixing step, wherein the forming the amorphous metal particles comprises heating a crystalline metal or alloy above a melting temperature of the crystalline metal or alloy such that the crystalline metal or alloy melts, and then rapidly cooling the melted crystalline metal or alloy to prevent recrystallization.

17. A method of forming an amorphous metal foam formed of an amorphous metal powder comprising:

placing an amorphous metal powder in a gas-tight chamber, and pressurizing the chamber with a pressurizing gas at a pressure sufficient to compact and bond the powder around gas-containing pores;

heat treating the compacted powder to increase a pressure of the gas within the gas-containing pores at a temperature and pressure sufficient to allow for a visco-plastic deformation of the powder, wherein the temperature is below any crystalline transition temperature of the amorphous metal, and for a duration not exceeding a time for any crystalline transformation of said amorphous metal powder;

cooling the compacted powder at a cooling rate sufficient to retain the amorphous state of the powder;

expanding the compacted powder to form a foam material, said expansion being conducted at an expansion temperature below any crystalline transition temperature of the metal powder, but sufficiently high to allow visco-plastic deformation during bubble expansion, at a surrounding pressure sufficient to promote expansion arising from a difference between a pressure in the gas-containing pores and the surrounding pressure, and for a duration not exceeding the time for any crystalline transformation to take place; and cooling the expanded foam material such that the material remains amorphous.

18. The method of claim 17 wherein the pressure of the chamber is from vacuum to over 100 atm.

19. The method of claim 17 wherein the pressure within the gas-containing pores is from about vacuum to over 2000 atm.

20. The method of claim 17 wherein the gas is selected from the group consisting of: helium, argon, air, nitrogen, and hydrogen.

21. The method according to claim 17 wherein compacting is performed by a method selected from the group consisting of: hot pressing, hot extrusion, hot forging, hot rolling and dyna-packing.

22. The method according to claim 17 wherein the amorphous metal powder is selected from the group consisting of Zr based alloys, Ti based alloys, Al based alloys, Fe based alloys, La based alloys, Cu based alloys, Mg based alloys, Pt based alloys and Pd based alloys.

*23. A method comprising:*

*heating a mixture comprising a propellant and an amorphous-metal powder to a compacting temperature that is below a crystalline transition temperature of the amorphous metal, thereby forming a heated mixture;*

*applying a pressure to the heated mixture for a duration not exceeding a time for crystalline transformation of the amorphous-metal powder, thereby compacting and bonding the amorphous metal into a structure enclosing at least some of the propellant in gas-tight pores;*

*forming, within the gas-tight pores, a gas from the propellant; and*

*expanding the structure at an expansion temperature that is below the crystalline transition temperature of the amorphous metal and at a surrounding pressure sufficient to permit expansion of the structure due to a pressure difference between the gas-tight pores and the surrounding pressure, the expanding occurring for a duration not exceeding the time for crystalline transformation of the amorphous metal.*

*24. The method according to claim 23 wherein the operation of forming the gas from the propellant comprises decomposing the propellant at least partly during expansion of the structure.*

*25. The method according to claim 23 wherein the operation of forming the gas from the propellant comprises decomposing the propellant at least partly during compaction of the heated mixture.*

*26. The method according to claim 23 wherein the mixture further comprises strength reinforcing components.*

*27. The method according to claim 23 wherein the amorphous metal is selected from the group consisting of Zr based alloys, Ti based alloys, Al based alloys, Fe based alloys, La based alloys, Cu based alloys, Mg based alloys, Pt based alloys, and Pd based alloys.*

*28. A method comprising:*

*applying, to a powder comprising an amorphous metal, a pressure sufficient to compact and bond the powder around gas-containing pores, thereby forming a body;*

*heat treating the body to increase a pressure of the gas within the gas-containing pores, the heat treating occurring:*

*at a temperature below a crystalline transition temperature of the amorphous metal;*

*at a surrounding pressure sufficient to allow for a visco-plastic deformation of the body; and*

*for a duration not exceeding a time for crystalline transformation of the amorphous metal; and*

*expanding the gas-containing pores of the body to form an expanded body, comprising:*

*heating the body to an expansion temperature that is below a crystalline transition temperature of the amorphous metal but sufficiently high to cause visco-plastic deformation of the amorphous metal during expansion; and*

*for a duration not exceeding the time for crystalline transformation of the amorphous metal, inducing a pressure difference between the gas-containing pores*

*and a surrounding environment sufficient to cause expansion of the gas-containing pores, thereby creating an expanded body; and*

*forming an article from the expanded body.*

*29. The method according to claim 28, wherein the body is a unitary structure.*

*30. The method according to claim 28, wherein the powder comprises a bulk-solidifying amorphous metal alloy.*

*31. The method according to claim 28, wherein the operation of expanding the gas-containing pores comprises decomposing a propellant to fill the gas-containing pores with a decomposition product of the propellant.*

*32. The method according to claim 28, further comprising decomposing a propellant during the operation of heat treating the body.*

*33. The method according to claim 28, wherein the article further comprises strength reinforcing components.*

*34. The method according to claim 28, wherein the amorphous metal is selected from the group consisting of Zr based alloys, Ti based alloys, Al based alloys, Fe based alloys, La based alloys, Cu based alloys, Mg based alloys, Pt based alloys, and Pd based alloys.*

*35. The method according to claim 28, wherein the gas containing-pores are elongate.*

*36. The method according to claim 28, wherein the article has a higher density toward an edge of the article than an interior of the article.*

*37. The method according to claim 28, wherein the article has a solid cover layer of a higher density than an interior of the article.*

*38. The method according to claim 28, wherein forming the article comprises forming a foamed sheet from the expanded body.*

*39. A method comprising:*

*compacting a powder comprising an amorphous metal to form a bonded structure defining a plurality of gas-tight pores, the compacting performed:*

*at a compacting temperature below a crystalline transition temperature of the amorphous metal;*

*at a compacting pressure sufficient to allow for bonding of the powder; and*

*for a duration not exceeding a time for crystalline transformation of the amorphous metal at the compacting temperature and pressure;*

*inducing a pressure difference between the gas-tight pores and an environment surrounding the structure; and*

*expanding the structure to produce a foam at an expansion temperature allowing visco-plastic deformation of the amorphous metal during expansion and for a duration not exceeding the time for crystalline transformation of the amorphous metal.*

*40. The method of claim 39, wherein inducing the pressure difference comprises decomposing a propellant captive within the gas-tight pores.*

*41. The method of claim 39, wherein inducing the pressure difference comprises reducing a pressure of the environment surrounding the structure.*

*42. The method of claim 41, wherein inducing the pressure difference further comprises decomposing a propellant captive within the gas-tight pores.*

*43. The method of claim 41, wherein inducing the pressure difference further comprises drawing a vacuum around the structure.*

*44. The method of claim 39, wherein the operation of compacting comprises visco-plastically deforming the amorphous metal.*

* * * * *